(12) United States Patent
Crosier et al.

(10) Patent No.: US 11,261,075 B2
(45) Date of Patent: *Mar. 1, 2022

(54) SYSTEM AND METHOD FOR DETERMINING A LIQUID LEVEL IN A VESSEL

(71) Applicant: DC Devices LLC, Parker, CO (US)

(72) Inventors: Drew V. Crosier, Parker, CO (US); Patrick Auell, Morrison, CO (US); Randon Kruse, Morrison, CO (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/899,097

(22) Filed: Jun. 11, 2020

(65) Prior Publication Data
US 2020/0300686 A1 Sep. 24, 2020

Related U.S. Application Data

(63) Continuation-in-part of application No. 15/965,495, filed on Apr. 27, 2018, now Pat. No. 10,718,654.

(60) Provisional application No. 62/490,950, filed on Apr. 27, 2017.

(51) Int. Cl.
| | |
|---|---|
| *B67D 1/08* | (2006.01) |
| *G01F 23/296* | (2006.01) |
| *G01F 23/2962* | (2022.01) |
| *G06Q 20/20* | (2012.01) |
| *G01F 1/66* | (2022.01) |
| *G01F 25/00* | (2022.01) |

(52) U.S. Cl.
CPC ......... *B67D 1/0871* (2013.01); *B67D 1/0801* (2013.01); *G01F 1/66* (2013.01); *G01F 23/296* (2013.01); *G01F 23/2962* (2013.01); *G01F 23/2963* (2013.01); *G06Q 20/203* (2013.01); *G06Q 20/208* (2013.01); *B67D 2001/0822* (2013.01); *G01F 25/0061* (2013.01)

(58) Field of Classification Search
CPC .................. F16H 21/02; B67D 1/0801; B67D 2001/0822; B67D 1/0871; G01F 23/296; G01F 23/2962

See application file for complete search history.

(56) References Cited

U.S. PATENT DOCUMENTS

| | | | | |
|---|---|---|---|---|
| 10,718,654 B2* | 7/2020 | Crosier | ................ | G01F 23/296 |
| 2016/0264394 A1* | 9/2016 | Hershberger | ........ | B67D 1/0855 |
| 2017/0052054 A1* | 2/2017 | Merker | .................. | G01S 7/003 |

* cited by examiner

*Primary Examiner* — Paul M. West
(74) *Attorney, Agent, or Firm* — Leyendecker & Lemire, LLC

(57) ABSTRACT

A system and method for determining a liquid level in a vessel is described. Embodiments of the system can include a liquid level measuring assembly, a user device, and a vessel. The liquid level measuring assembly can include an ultrasonic sensor assembly, a control module, and a mount body configured to place the ultrasonic sensor assembly proximate a bottom of a vessel. Typically, the system can be implemented with a vessel having a substantially cylindrical shape and including a chime. The mount body can be adapted to removably couple to the inside of the chime of the vessel.

20 Claims, 12 Drawing Sheets

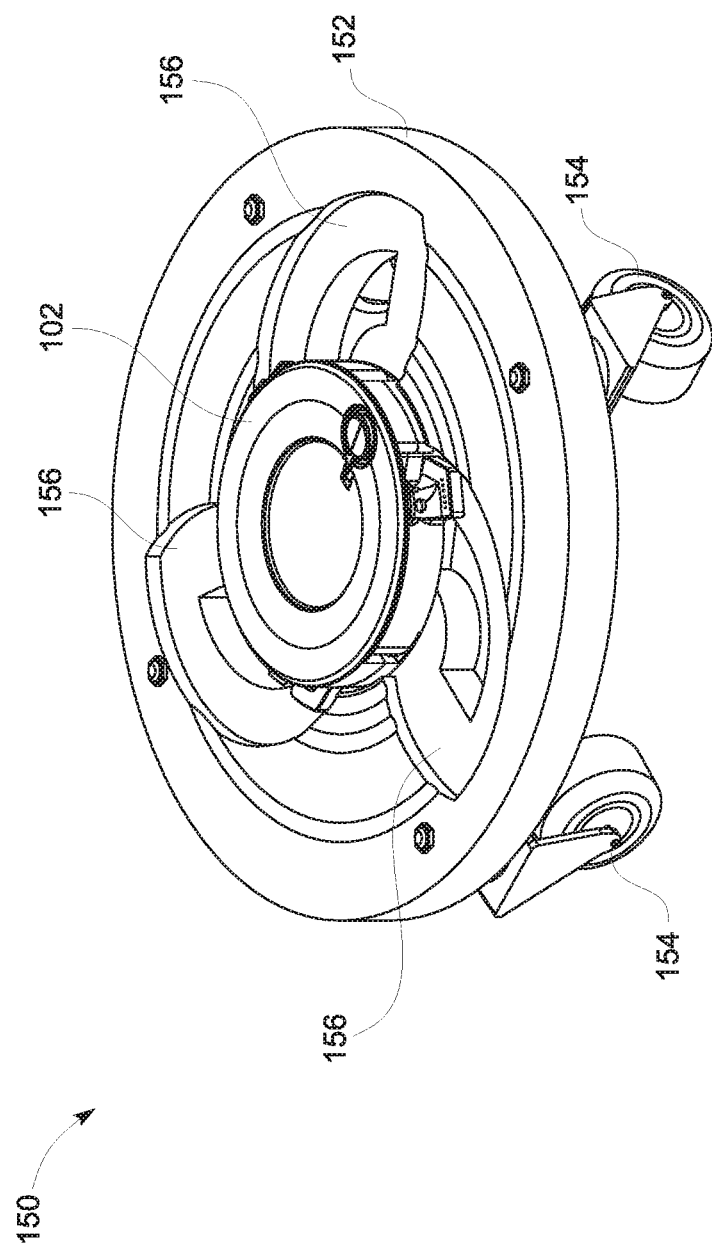

SYSTEM AND METHOD FOR DETERMINING A LIQUID LEVEL IN A VESSEL

CROSS-REFERENCE TO RELATED APPLICATION

This application claims the benefit of U.S. Provisional Application No. 62/490,950, filed Apr. 27, 2017.

This application is a continuation-in-part of U.S. application Ser. No. 15/965,495, filed Apr. 27, 2018.

BACKGROUND

Systems and methods for determining the level of liquid in a container using ultrasonics is known. However, the sensors associated with these systems are either built into, or permanently attached to, a particular vessel. A system that is moveable between vessels and that is adaptable to vessels of different sizes is not known. This is particularly true in the beverage industry and more particularly in the beer industry.

No system for accurately measuring the amount of beer remaining in a keg is known using ultrasonics wherein the ultrasonic sensor assembly can be easily moved and calibrated for the vessel to which the ultrasonic sensor assembly is attached.

BRIEF DESCRIPTION OF THE DRAWINGS

FIG. 5A is a perspective view of a dolly and a liquid level measuring assembly according to one embodiment of the present invention.

DETAILED DESCRIPTION

Figure 1A:
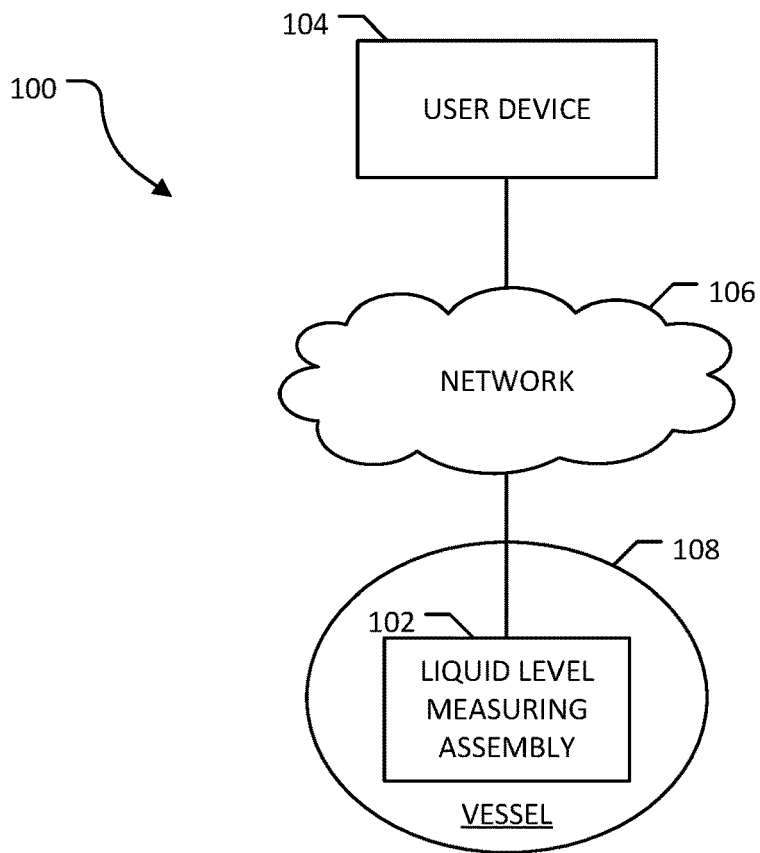
FIG. 1A is a block diagram of a liquid level measuring system according to one embodiment of the present invention.

Embodiments of the present invention include a system and a method for determining a liquid level in a vessel. In one embodiment, the liquid level measuring system can include, but is not limited to, a liquid level measuring assembly, a user device, and a vessel. The system can combine hardware, software, and various components to determine a level of a liquid contained in a vessel. For instance, the system can be implemented to determine an amount of beer in a keg. Embodiments can be implemented to removably couple to a chime of varyingly sized kegs. For instance, the system can removably couple to a ⅙ barrel up to a half barrel sized keg.

In one embodiment, the liquid level measuring assembly can be implemented with a keg primarily for a measurement of beer contained therein. It is to be appreciated that embodiments of the system are contemplated for use with other liquid containing vessels especially, but not limited to, those having a rounded bottom, and including pressurized vessels that contain pressurized liquid, such as propane. The system can be most applicable to vessels comprised of steel although variations of the system are contemplated for vessels of other materials as well. For instance, the system can be implemented with vessels comprised of rigid plastics including, but not limited to, high-density polyethylene (HDPE), polycarbonate, polypropylene, polyvinyl chloride (PVC), and/or acrylonitrile butadiene styrene.

A keg can typically be made from stainless steel (e.g., type 304 stainless steel alloy). The 304-stainless steel alloy is predominately austenitic, and accordingly, non-magnetically receptive. However, when cold worked, some of the austenite transforms into martensite, which is magnetically receptive. A chime can be provided around a bottom end of the keg to facilitate support of the vessel on a flat surface without falling or tipping over. The chime or rim around the bottom of the keg, especially where the chime is folded over into a foot, typically undergoes sufficient cold working to impart magnetic receptiveness to this portion of the keg structure.

Generally, embodiments of the liquid level measuring assembly can include, but are not limited to, an ultrasonic sensor assembly, a mount body, an electronic control module (e.g., a control module). Variations can further include a temperature sensor. The ultrasonic sensor assembly can include an ultrasonic sensor configured to send signals, the signals including ping time data, to the control module. The ultrasonic sensor assembly can be configured to be movably housed in the mount body. For instance, a location of the ultrasonic sensor can be raised or lowered depending on an implementation.

In one embodiment, the ultrasonic sensor can be located at an intermediate location relative to a center and a circumferential edge of a vessel the mount body is coupled to. Since a keg typically has a siphon tube or spear that extends to a bottom center of the vessel, the ultrasonic sensor cannot be located at a location corresponding to the kegs center axis. Accordingly, the ultrasonic sensor can be placed along a curved bottom surface of the keg, between the center axis and an outer edge of the keg. An approximate position of the ultrasonic sensor and an associated angle of the ultrasonic sensor can be determined so that the ultrasonic ping reflects back to the ultrasonic sensor from a top surface of the liquid in the vessel and is not reflected back to a location on the bottom or side of the keg remote from the ultrasonic sensor. As can be appreciated, the ultrasonic sensor should be placed such that a spear and/or walls of a vessel are not impacted by pings from the ultrasonic sensor that would distort feedback to the ultrasonic sensor. In one instance, placing the ultrasonic sensor against the curved bottom surface where the ultrasonic ping is set at an angle of approximately 4 degrees or less has been found to be suitable for use in standard sized kegs. Other angles and positions can be used with vessels of differing configurations. For instance, a more accurate ultrasonic sensor may be able to accurately measure ping times while set at an angle of approximately 12 degrees or less.

The control module (or controller) can include, but is not limited to, one or more processors, nonvolatile storage, random access memory, and a network interface. The control module may further include one or more ports for operatively connecting to the ultrasonic sensor, a temperature sensor, other electronic devices, etc.

The mount body can have an effective diameter permitting the mount body to be received inside of a chime of a keg. For instance, outer edges of the mount body can be close to the inside edges of a foot portion of the chime. Typically, the mount body can include a plurality of swing arms (referred to later as engagement members) configured to move radially inwardly and outwardly to accommodate vessels having different diameters. In one embodiment, the mount body can have a fixed diameter.

One or more cavities can be provided in the mount body to accommodate the various electronic components. For instance, a sensor cavity can be provided for the ultrasonic sensor assembly and a cavity can be provided for the control module. Gaskets and a cover can typically be provided to cover and seal the control module cavity to prevent condensation and spilt liquid from infiltrating the cavity and damaging the controller. Cavities or depressions can also be provided for a temperature sensor and a 12v port as well as electrical wires or traces that extend back to the controller. Of note, different power sources are contemplated including a rechargeable battery and any standard battery currently available on the market. For instance, renewable energy (e.g., solar power) can be implemented to charge a battery source to power the electronic components of the system. In other instances, rechargeable batteries can be implemented to power the electronic components.

In one embodiment, the mount body can be fabricated from a plastic material. In another embodiment, the mount body can be fabricated from other rigid materials (e.g., metal or metal alloys). The shape and configuration provided and described herein is merely illustrative and it is to be understood that mount bodies having significantly different shapes and configurations are contemplated.

Typically, high powered magnets, such as rare earth magnets, can be distributed around the circumferential edges of the swing arms of the mount body. For example, in some embodiments Neodymium magnets grade 52 can be implemented. A number and location of the magnets in the swing arm may vary from embodiment to embodiment. Further, the size of the magnets can vary in size depending on a particular implementation. High powered magnets are preferred to maximize holding power against the moderately magnetic foot of the chime. The magnets in combination provide sufficient holding power to removably secure the assembly to the keg with the surface of a pad of the ultrasonic sensor in direct contact with the bottom of the keg. Typically, the pad can be a gel pad.

In variations, the mount body can be secured to the bottom of the keg by other means, such as clamping force obviating the need for the magnets. For instance, for a variation that allows the diameter of the mount to be varied, it can also be configured to press against the inside of the chime to hold the mount body in place. In one example, springs can be implemented to bias the swing arms of the mount body outwardly to engage a chime of a non-metallic chime. For application to vessels not comprised of materials other than magnetically receptive steel, the system could not be secured to the vessel by a magnetic means alone.

As previously mentioned, the control module can typically be contained within a waterproof cavity in the mount body. In some embodiments, some of the control module functions can also be performed by a chipset contained in the head of the ultrasonic sensor. The control module contained in the waterproof cavity may exist to transmit the information received from logic of the ultrasonic sensor to an application on a remote device, such as a smart phone. In some instances, the control module may also process information received from logic of the ultrasonic sensor to determine an amount of liquid in a vessel.

In some variations the control module can be separate from the mount body and can include a cable that may plug into a port on the mount body to operatively couple the control module with the ultrasonic sensor. In one alternative embodiment, a separate control module can include a means to operatively connect with a plurality of ultrasonic sensors and have the ability to determine the contents of more than a single vessel simultaneously. With respect to the separate control module, the control module can couple to the ultrasonic sensor by way of a cable or through a wireless protocol, such as Bluetooth. The wireless protocol can include, but is not limited to, wireless personal area network (WPAN-Bluetooth/BLE) technologies, wireless local area network (WLAN-WIFI) technologies, wireless metropolitan area network (WMAN) technologies, and wireless wide area network (WWAN) technologies. Of note, when the connection is wireless, the ultrasonic sensor assembly will typically include a battery or other power source and a wireless transmitter.

Regardless of where the control module may be located, the control module can generally comprise one or more processors and memory that receive signals from the ultrasonic sensor and use this information to calculate the amount of liquid remaining in the vessel. This can typically be done by accessing information stored in the memory that contains the expected time for an ultrasonic ping to make a round trip from the ultrasonic sensor to the top of a liquid in the vessel and back for a given amount of liquid contained in a vessel of known dimensions. When the assembly is installed on a keg, the controller can be set for the particular type of keg or vessel so that the system will either know what look up table to access in memory or what algorithm to apply in order to determine the amount of liquid in the keg/vessel. The algorithms and methodology of determining the amount of liquid in a vessel as a result of the time it takes an ultrasonic ping to complete a round trip is understood in the art and is not discussed herein in greater detail The control module can typically be configured to interface with an application on a computing device, such as a tablet or smart phone, by way of wireless communication. A wireless transmitter located in the control module can transmit data to the application and the application can be configured to display information concerning an amount of liquid in the keg/vessel. In some alternative embodiments and variations, the calculation of the amount of liquid contained in the keg/vessel can be determined by the application after receiving ping timing data from the control module. In such a variation, the control module itself does little or no computing but serves merely to receive a signal from the ultrasonic sensor and transmit the signal to the application.

In some embodiments, the control module can include a port to connect to a power adapter. In some variations, the control module may also include a battery power source to permit operation remote from an external power source.

In one embodiment, the ultrasonic sensor assembly can include, but is not limited to, a housing, a biasing mechanism, an ultrasonic sensor, and a flexible (or elastomeric) pad. Typically, the pad can be a gel pad. The biasing mechanism and the ultrasonic sensor can be located in the housing with the flexible pad being implemented to provide contact between the ultrasonic sensor assembly and the bottom of a keg. Typically, the biasing mechanism can be implemented to push the flexible pad up against a bottom of the keg to provide a gap free interface between the ultrasonic sensor and the bottom of the keg. Of note, by providing a gap free interface between the ultrasonic sensor and the keg, consistently accurate ping times can be measured by the ultrasonic sensor.

A distance between a bottom of a chime and the bottom of the barrel of a keg can vary by as much as 1½ inches depending on the size of the keg. Since a height between a bottom of a chime of a keg and a bottom of the barrel of the keg vary depending on the size of the keg, the ultrasonic sensor assembly can include the biasing mechanism to change an effective height of the housing of the ultrasonic sensor assembly to get a gap free interface between the ultrasonic sensor assembly and the keg.

Of significant note, an air gap-free contact with the bottom of the keg is critical to a proper operation of the ultrasonic sensor. Air gaps can act to introduce inaccuracies into ping transmission times. The ultrasonic sensor assembly can act to press the ultrasonic sensor up against the curved bottom surface of the keg, aligning the electronic sensor with the bottom surface of the keg and greatly reducing a risk of air gaps.

In one embodiment, the ultrasonic sensor can be cradled in a resilient and compliant elastomeric cup wherein a top rim of the cup can extend past a top surface of the electronic sensor a small amount to form a lip. A shallow bowl can be created wherein an ultrasonic gel or other liquid couplant can be deposited prior to attaching the mount body to the bottom of the keg. The lip can hold the gel in place ensuring a better coupling of the ultrasonic sensor to the bottom surface of the keg. The resilient and compliant nature of the lip can also permit the lip to deform as necessary to ensure complete coupling of the ultrasonic sensor. In one variation, the elastomeric cup can be omitted and the liquid gel couplant can be replaced with a solid gel type material that can flow locally to ensure an air free connection with the bottom surface of the vessel but have sufficient structural integrity to remain in place on top of the ultrasonic sensor.

In one embodiment, the ultrasonic sensor can be received in the elastomeric cup that can rest on top of the top plate. A pivot point can be provided at the center of the ultrasonic sensor. The pivot point can be a hinge or a spherical bearing. A plurality of springs can be provided on the bottom side of the ultrasonic sensor proximate and distributed around a perimeter of the ultrasonic sensor. The plurality of springs can permit the ultrasonic sensor to align itself to the curved bottom of the vessel.

In one embodiment, the ultrasonic sensor assembly can rest in a cavity provided in a desired location on the mount body. Typically, the desired location can be proximate a perimeter of the mount body In one embodiment, the ultrasonic sensor assembly can employ magnets and springs to push the ultrasonic sensor against the bottom of the keg. Of note, a specific configuration of the springs and/or magnets can vary significantly and substantially in variations of the present invention.

In one embodiment, the ultrasonic sensor assembly can be characterized by a pair of magnetic base plates connected at an edge by a hinge. An axis of the hinge can be orthogonal to a radial line emanating from the center of the mount body. A bottom plate can typically be supported within the floor of the ultrasonic sensor cavity by way of a plurality of springs. An upper plate can be coupled to the bottom plate by the aforementioned hinge. Opposite the hinge and in-line with a radial line, a spring can be provided to encourage the upper plate and the ultrasonic sensor to conform to the curved bottom of the vessel. The magnetic upper and lower plates can be orientated such that like poles are facing each other causing the upper plate to repel from the bottom plate about the hinge. As can be appreciated, this can help align and orientate the upper plate and the ultrasonic sensor firmly against the bottom of the vessel.

Embodiments of the present invention are contemplated wherein the liquid level measuring assembly can be more permanently attached to a vessel. For instance, the liquid level measuring assembly can be integrated into a bottom of the vessel. In another instance, the liquid level measuring assembly could be fixed to the vessel while or after the vessel has been manufactured. For example, an adhesive can be implemented to couple the liquid level measuring assembly more permanently to the vessel. In one example, an epoxy resin (e.g., polyepoxides) can be implemented. In such an embodiment, an end user could have an application configured to connect to the control module of the liquid level measuring assembly to receive data from the liquid level measuring assembly once the vessel is delivered to the end user. As can be appreciated, the vessel could be continuously reused with each new user the vessel is delivered to able to connect to the control module of the liquid level measuring assembly.

Embodiments of the present invention can be implemented to help determine an amount of wasted liquid being sold from a container. Of note, although liquid being sold is mentioned, it is to be appreciated that other instances of when a liquid is depleted from a container can be tracked to determine waste. A method for determining an amount of wasted liquid can include, but is not limited to, the following steps. First, a liquid level measuring assembly can be provided. The assembly can include an ultrasonic sensor, a control module, and a mount body. The control module can be configured to receive signals from the ultrasonic sensor. The mount body can include a ring and three engagement members operatively interfacing with the ring. The ring can have a plurality of teeth. The three engagement members can each include (i) one or more magnets located at a distal end and (ii) a plurality of teeth located at a proximal end adapted to operatively interact with the plurality of teeth of the ring. Second, the liquid level measuring assembly can be secured to the container. Third, an amount of wasted liquid can be determined.

The step of determining an amount of wasted liquid can include, but is not limited to, the following steps. First, data can be received from the control module of the liquid level measuring assembly. Second, an actual liquid level can be determined based on the data received from the control module. Third, data from a point of sale system associated with the container can be received. Fourth, an expected liquid level can be determined based on the data received from the point of sale system. Fifth, the actual liquid level can be compared to the expected liquid level to determine the amount of wasted liquid. Of note, the method of determining an amount of waste can be implemented in other instances where a point of sale system may not be used. Typically, the method can be applied where a liquid is depleted from a container and an amount of liquid depleted is tracked.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of a Liquid Level Measuring System

Referring to FIG. 1A, a block diagram of a first embodiment 100 of a liquid level measuring system is illustrated. The liquid level measuring system 100 can be implemented to determine an amount of liquid in a vessel. Typically, the system 100 can be coupled to a bottom of a vessel and implement an ultrasonic sensor to determine (or measure) an amount of liquid in the vessel based on ping times of the ultrasonic sensor.

As shown, the liquid level measuring system 100 can include, but is not limited to, a liquid level measuring assembly 102, a user device 104, and a network 106. The liquid level measuring assembly 102 can be removably coupled to a vessel 108 from which a level of a liquid in the vessel 108 can be determined. Typically, the vessel 108 can be configured to be a pressurized vessel including, but not limited to, kegs, barrels, gas tanks, etc. For instance, the vessel may be a keg configured to store beer. In another instance, the vessel may be a tank configured to store liquified propane. The network 106 can be implemented to remotely connect the liquid level measuring assembly 102 to the user device 104. Typically, the user device 104 can be a smart device including a smartphone or a tablet. It is to be appreciated that other electronic devices are contemplated.

Figure 1B:
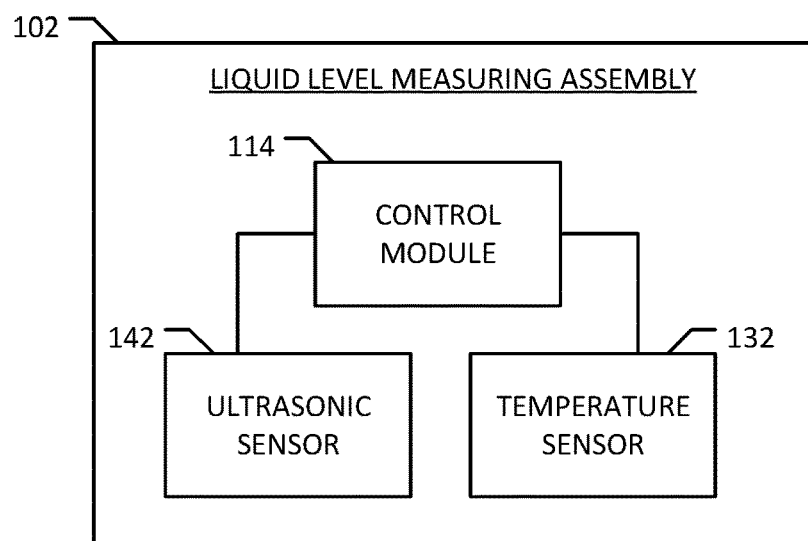
FIG. 1B is a block diagram of a liquid level measuring assembly according to one embodiment of the present invention.

Referring to FIG. 1B, a block diagram of the liquid level measuring assembly 102 is illustrated. As shown, the liquid level measuring assembly 102 can include, but is not limited to, a control module 114, a temperature sensor 132, and an ultrasonic sensor 142. The temperature sensor 132 and the ultrasonic sensor 142 can be operatively connected to the control module 114 to send data to the control module 114.

The control module 114 can represent a computing device or another powerful, dedicated computer system. The control module 114 can typically include a hardware platform and software components.

The software components of the control module 114 can include one or more databases which can store keg dimension information, ping time calculations, liquid level equations, and data. The software components can also include an operating system on which various applications can execute. In one embodiment, the control module can include an application dedicated to sending, storing, and receiving information related to ping times from the ultrasonic sensor. For instance, the application can receive ultrasonic ping times and calculate a liquid level based on the ping times.

The hardware platform of the control module 114 can include, but is not limited to, a processor, random access memory, and nonvolatile storage. The processor can be a single microprocessor, multi-core processor, or a group of processors. The random-access memory can store executable code as well as data that can be immediately accessible to the processor. The nonvolatile storage can store executable code and data in a persistent state. The hardware platform can also include a network interface. The network interface can include, but is not limited to, hardwired and wireless interfaces through which the control module can communicate with other devices. The network can be any type of network, such as a local area network, wide area network, or the Internet. In some cases, the network can include wired or wireless connections and may transmit and receive information using various wireless protocols including, but not limited to, Bluetooth, near field communication, etc.

The user device 104 can be any type of computing device on which a browser or mobile application can operate. Examples of such devices can include, but are not limited to, smart devices, desktop computers, laptop computers, tablet computers, mobile telephones, smart phones, game consoles, network appliances, or any other web-enabled devices. In an embodiment, the user device 104 can have various hardware platforms on which a browser can execute. The browser can be used to access the HTML user interface of the database manager. In one embodiment, the user device can be implemented as a server. For instance, the user device can include an application or program configured to call and to receive data from one or more databases including information related to calculating an amount of liquid based on ping times.

Figure 2A:
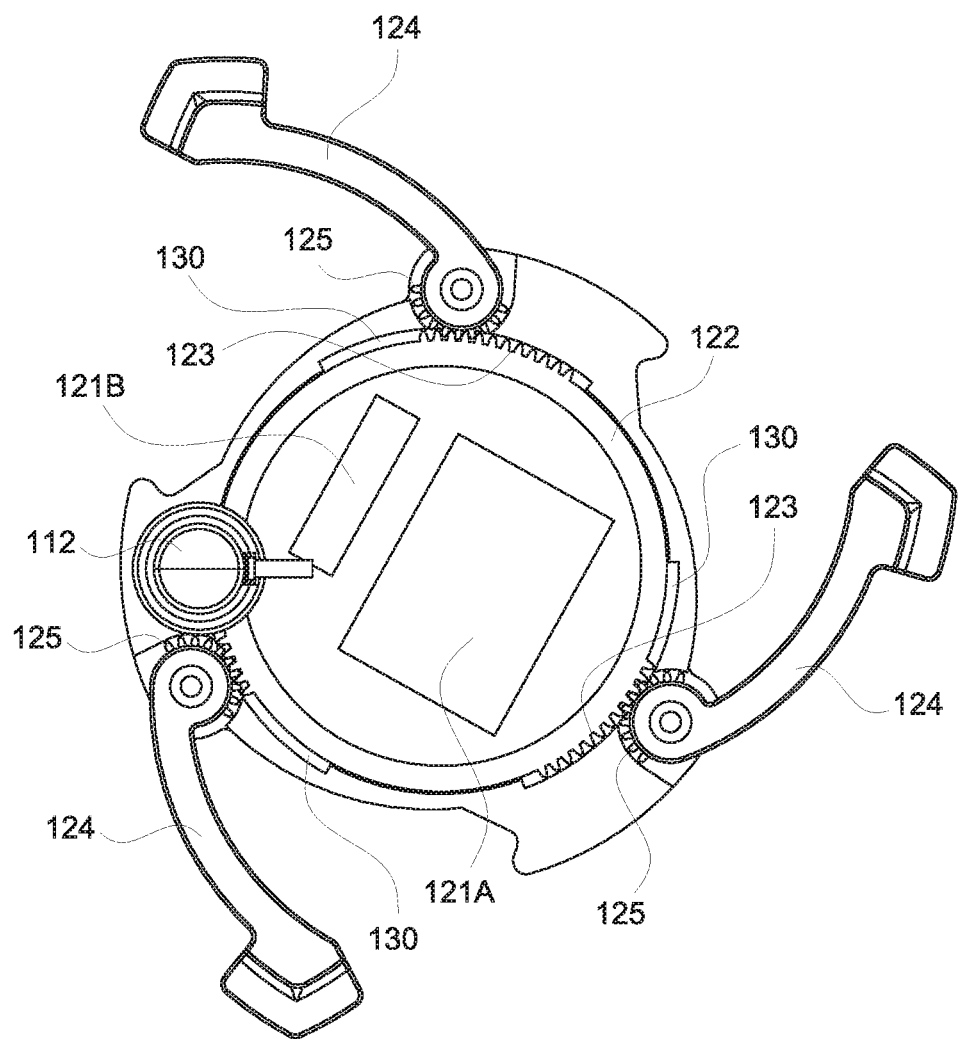
FIG. 2A is a top view of a liquid level measuring assembly according to one embodiment of the present invention.
Figure 2B:
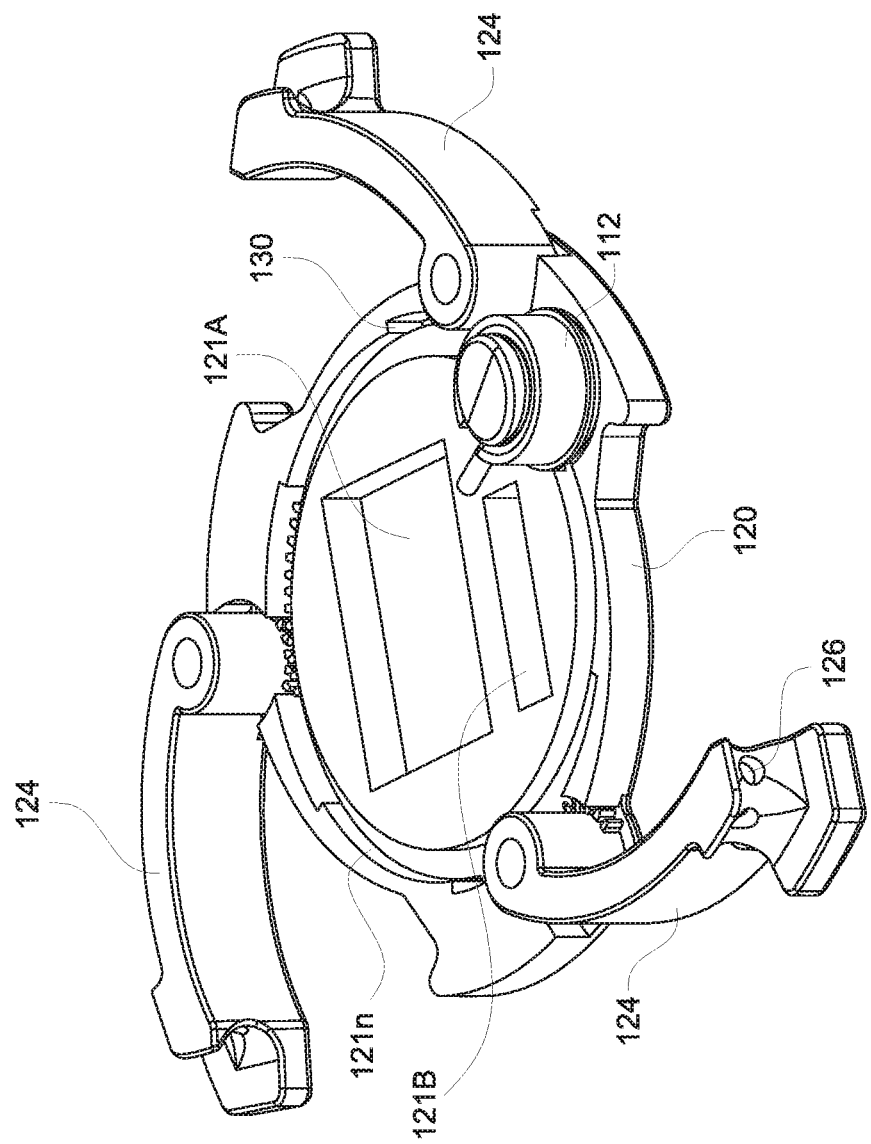
FIG. 2B is a perspective view of a liquid level measuring assembly according to one embodiment of the present invention.
Figure 2C:
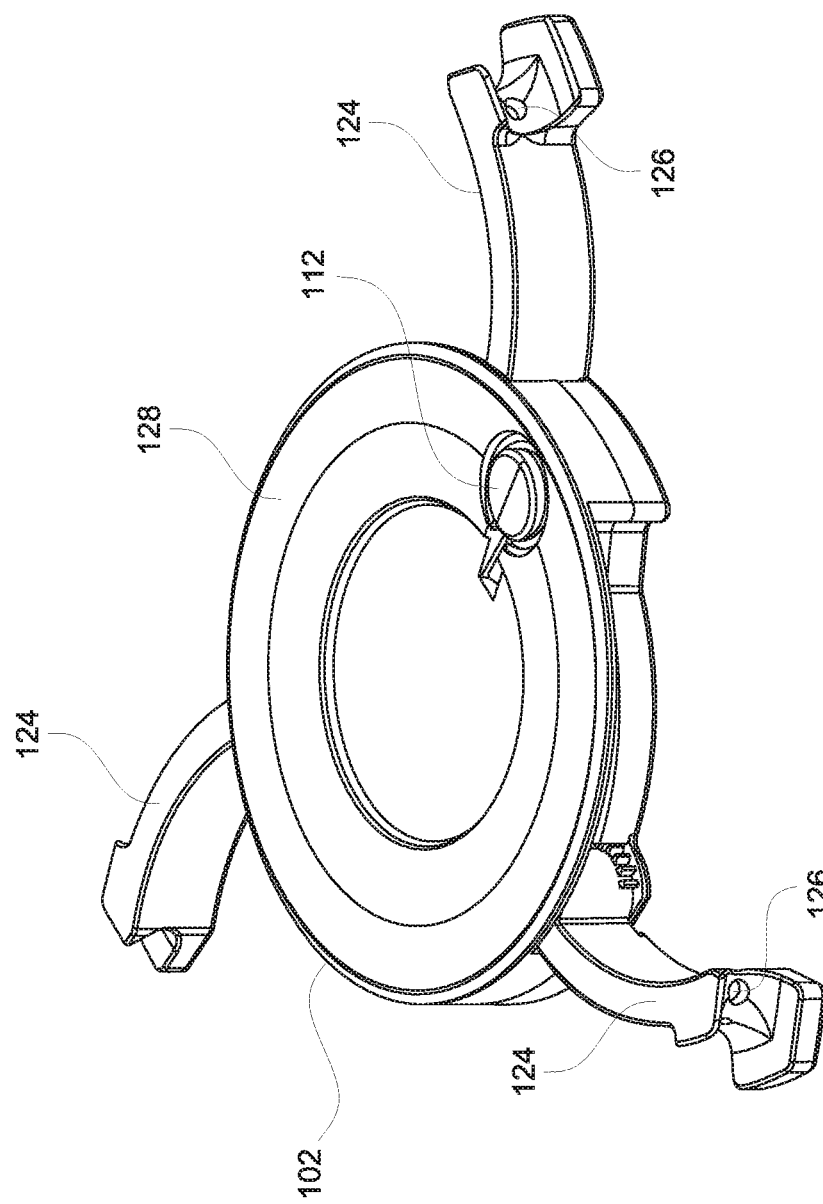
FIG. 2C is a perspective view of a liquid level measuring assembly according to one embodiment of the present invention.
Figure 3A:
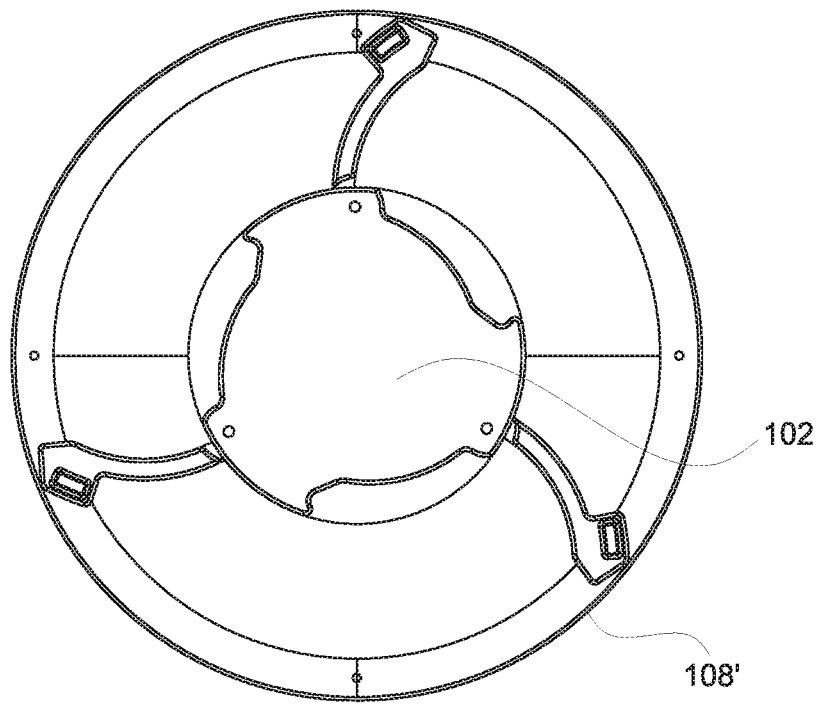
FIG. 3A is a bottom view of a liquid level measuring assembly removably coupled to a vessel according to one embodiment of the present invention.
Figure 3B:
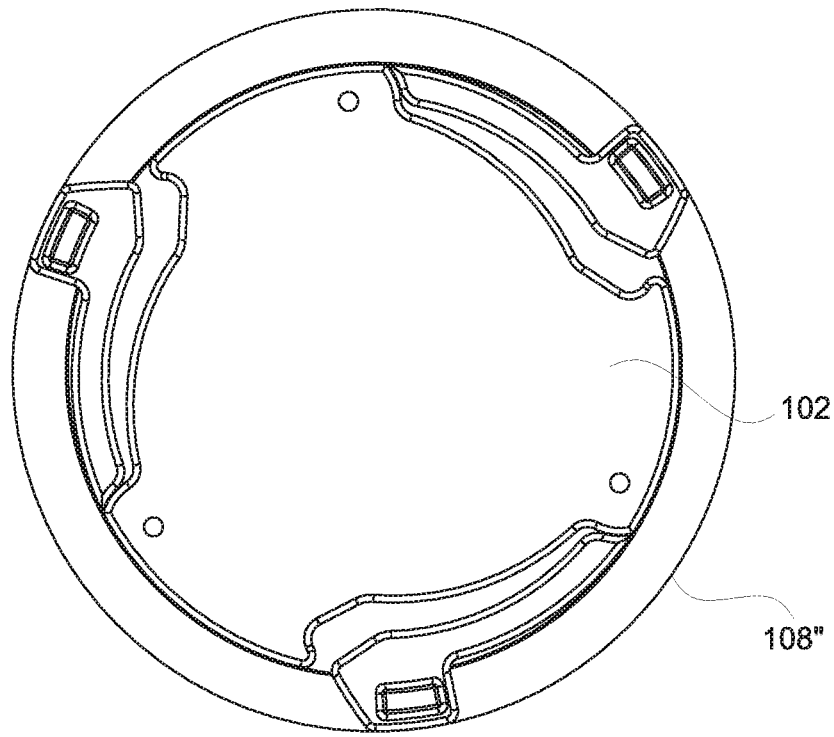
FIG. 3B is a bottom view of a liquid level measuring assembly removably coupled to a vessel according to one embodiment of the present invention.

Referring to FIGS. 2A-2C, detailed diagrams of one embodiment of the liquid level measuring assembly 102 are illustrated. In one embodiment, the liquid level measuring assembly 102 can include, but is not limited to, a mount body 110, an ultrasonic sensor assembly 112, and a control module 114. The mount body 110 can be implemented to couple the ultrasonic sensor assembly 112 proximate a vessel. Typically, the mount body 110 can be configured to mount the liquid level measuring assembly 102 on a bottom of the vessel 108 (As shown in FIGS. 3A-3B). For example, the mount body 110 can couple the assembly 102 to a bottom of a keg barrel. The ultrasonic sensor assembly 112 can be implemented to provide an ultrasonic ping that can be measured by the assembly 112. The control module 114 can be implemented to transmit the ultrasonic ping times to the user device 104, and in some instances, calculate an amount of liquid in a vessel based on the ping times.

Referring to FIG. 2A, a top view of the mount body 110 with a top cover 128 removed is illustrated. As shown, the mount body 110 can include, but is not limited to, a base 120, a ring 122 including a plurality of teeth 123 forming a gear, a plurality of engagement members (or arms) 124, and a plurality of magnets 126 located in each of the engagement arms 124.

Referring to FIG. 2B, a perspective view of the liquid level measuring assembly 102 is illustrated. As shown, the ultrasonic sensor assembly 112 can be located proximate a perimeter of the mount body 110.

Referring to FIG. 2C, a perspective view of the liquid level measuring assembly 102 with a top cover 128 coupled to the base 120 is illustrated.

As shown generally in FIGS. 2A-2C, the liquid level measuring assembly 102 can typically have a substantially cylindrical shape with the ultrasonic sensor assembly 112 being located proximate a perimeter of the assembly 102. Of note, an effective diameter of the assembly 102 can be increased or decreased by the plurality of engagement arms 124. As will be discussed hereinafter, the plurality of engagement arms 124 can be configured to rotate in sync from the mount body 110, allowing the ultrasonic sensor assembly 112 to be consistently placed in a similar location when coupled to the vessel 108. As previously mentioned, an ultrasonic sensor of the ultrasonic sensor assembly 112 needs to be placed between a center of a vessel and an outer edge of the vessel to accurately calculate an amount of liquid within the vessel.

The base 120 can include a plurality of cavities 121a-121n each configured to store a component of the liquid level measuring assembly 102. For instance, a first cavity 121a can be configured to store the control module 114, a second cavity 121b can be configured to store a temperature sensor 132, a third cavity 121c can be configured to store the ultrasonic sensor assembly 112, and a fourth cavity 121n can be configured to receive the ring 122.

The plurality of ring teeth 123 can typically be located on a perimeter of the ring 122 and extend out from the outer edge of the ring 122. In one embodiment, as shown, the plurality of ring teeth 123 can include three groups (or sets) of teeth spaced equidistantly around the ring 122. As will be discussed hereinafter, the ring teeth 123 can be implemented to interact with the plurality of engagement arms 124.

The ring cavity 121n can include a plurality of channels 130 within which the ring teeth 123 can move. Typically, the channels 130 can be sized to allow the ring 122 to rotate a predetermined distance dictating how far out the engagement arms 124 can rotate out. Stated alternatively, the channels 130 can be implemented to limit an amount of rotation of the ring 122, which in turn, limits an amount of movement of the engagement arms 124. Of note, embodiments are contemplated wherein the ring cavity 121n is sized to receive the ring teeth 123 such that the ring can rotate approximately 360 degrees.

Each of the plurality of engagement arms 124 can include a plurality of teeth 125 that are configured to interact with the plurality of teeth 123 of the ring 122. As shown, the plurality of teeth 125 can be located at a proximal end of the engagement arms 124. The engagement arm teeth 125 can generally extend out from a perimeter of the proximal end of the engagement arms 124.

The plurality of teeth 123 on the ring 122 can be spaced such that there is a group of teeth to interact with each of the teeth 125 of the engagement arms 124. As can be appreciated, since each of the engagement arms 124 interact with the ring 122, when one of the arms are moved, each of the arms will move based on the interaction with the ring 122. Stated alternatively, as the ring 122 is rotated, each of the engagement arms 124 can rotate in or out depending on which direction the ring 122 is rotated.

Of note, the liquid level measuring assembly 102 can be sized such that the entire assembly 102 fits within a chime of a keg. By fitting inside the chime of a keg, kegs can be stacked on top of each other with a liquid level measuring assembly 102 coupled to each keg. As can be appreciated, a vendor may deliver kegs with the liquid level measuring assembly 102 coupled to a keg and still effectively transport and store the kegs until use.

Referring to FIGS. 3A-3B, detailed diagrams of the liquid level measuring assembly 102 coupled to the vessel 108 are illustrated.

As shown in FIG. 3A, the liquid level measuring assembly 102 can be coupled the bottom of a vessel 108', where the vessel 108' is a half barrel (or full keg). Of note, the engagement arms 124 can rotate out to engage a chime of the half barrel. Typically, the half barrel can have a diameter of approximately 16-17 inches. The ultrasonic sensor assembly 112 can include a biasing mechanism (e.g., a spring) to push the pad towards and against a bottom of the keg. Of note, different sized kegs or barrels will have different chime heights requiring the ultrasonic sensor assembly 112 to have a variable height.

As shown in FIG. 3B, the liquid level measuring assembly 102 can be coupled to the bottom of a vessel 108", where the vessel 108" is a ⅙ barrel. Of note, the engagement arms 124 are rotated into the mount body 110 to allow the assembly 102 to removably couple to the bottom of the ⅙ barrel. The ⅙ barrel can have a diameter of approximately 9¼ inches. As can be appreciated, the liquid level measuring assembly 102 can be removably coupled to a half barrel, removed once the half barrel is empty, and then removably coupled and implemented with another barrel having a similar or smaller size.

Figure 4:
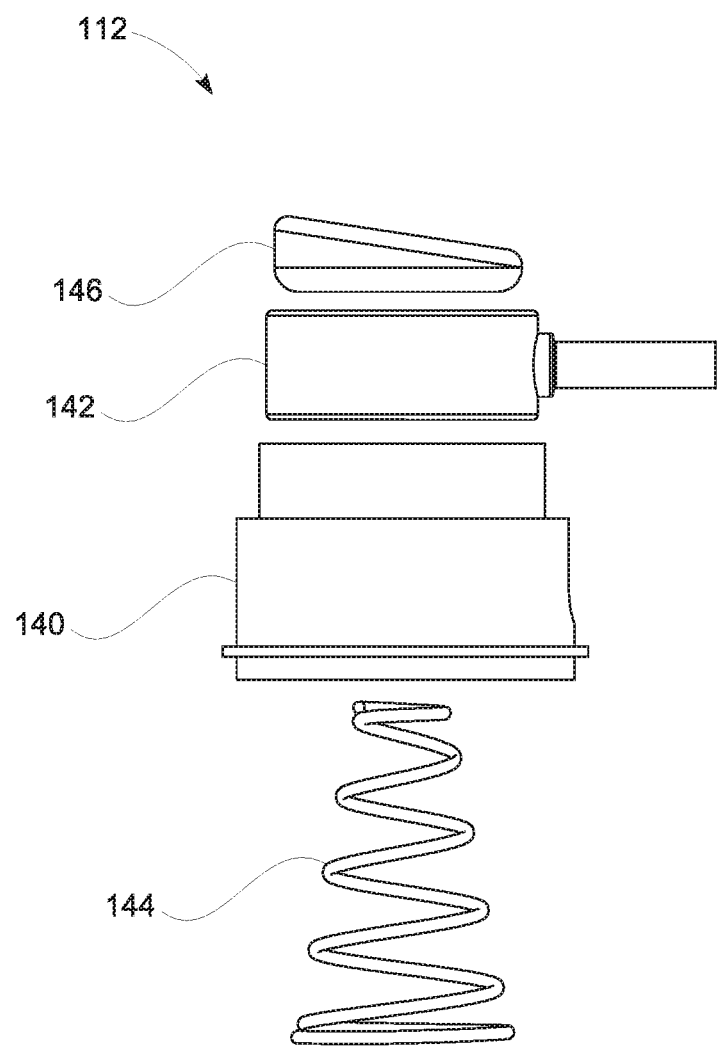
FIG. 4 is an exploded side view of an ultrasonic sensor assembly according to one embodiment of the present invention.

Referring to FIG. 4, an exploded side view of one embodiment of the ultrasonic sensor assembly 112 is illustrated. As shown, the ultrasonic sensor assembly 112 can include, but is not limited to, a telescoping housing 140, an ultrasonic sensor 142, a biasing mechanism 144, and a pad 146.

The biasing mechanism 144 can be located in the housing 140. The pad 146 can be located proximate the ultrasonic sensor 142 and can be implemented to provide contact between the ultrasonic sensor assembly 112 and the bottom of a keg. As previously noted, the pad 146 can be a gel pad. The gel pad 146 can amplify a signal generated by the ultrasonic sensor 142. Typically, the biasing mechanism 144 can be implemented to push the pad 146 up against a bottom of the keg to provide a known distance and material for calculating liquid levels based on ping times. Of note, by providing the pad 146 between the ultrasonic sensor 142 and the keg, consistently accurate calculations can be made from ping times detected by the ultrasonic sensor 142.

As shown in FIG. 4, the pad 146 can have a tapered profile for interfacing with a curved bottom of a keg. As can be appreciated, by including the tapered profile, the pad 146 can be effectively pressed against a bottom of the keg providing a gap free contact between the ultrasonic sensor assembly 112 and the vessel 108. Typically, the pad 146 can be comprised of a flexible material configured to conform to a bottom of the vessel 108. For instance, the pad 146 may include a gel or other semi-liquid material easily conformed to various shapes. In another instance, the pad 146 may include a polymeric coating filled with a liquid.

A distance between a bottom of a chime and the bottom of the barrel of a keg can vary by as much as 1½ inches depending on the size of the keg. Since a height between a bottom of a chime of a keg and a bottom of the barrel of the keg vary depending on the size of the keg, the ultrasonic sensor assembly 112 can include the biasing mechanism 144 to press the pad 146 against the bottom of the keg.

Figure 5B:
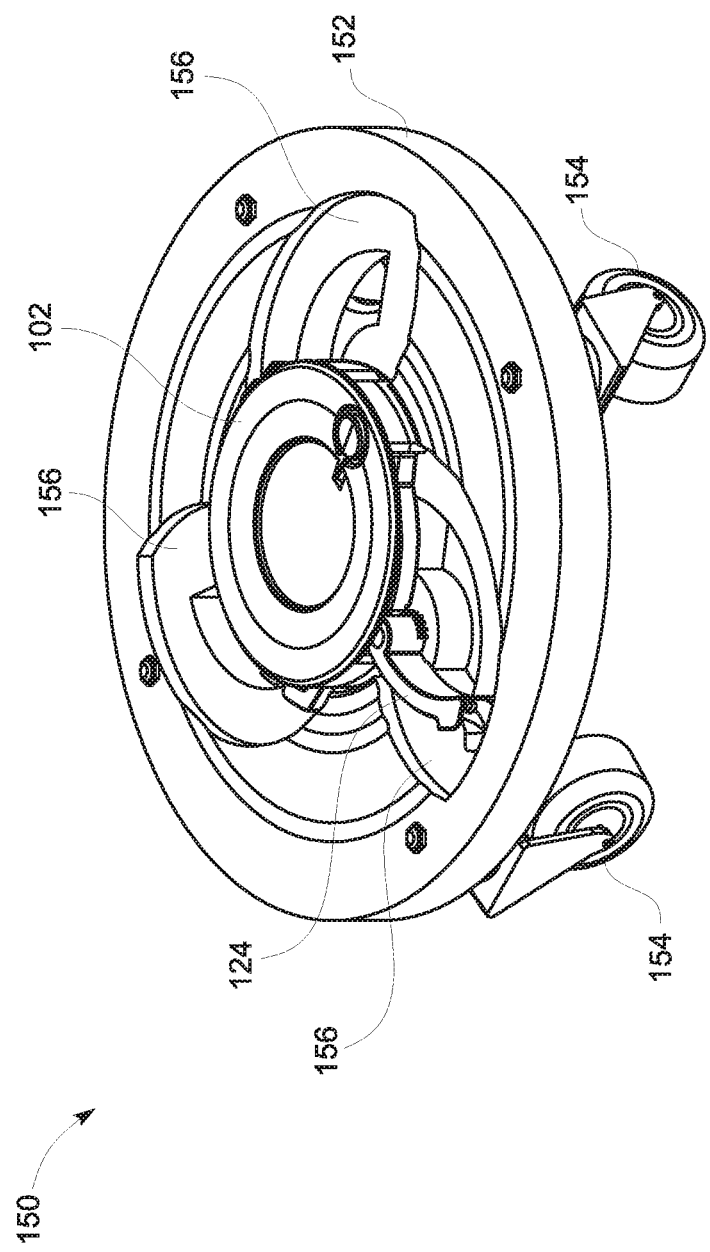
FIG. 5B is a perspective view of a dolly and a liquid level measuring assembly according to one embodiment of the present invention.
Figure 5C:
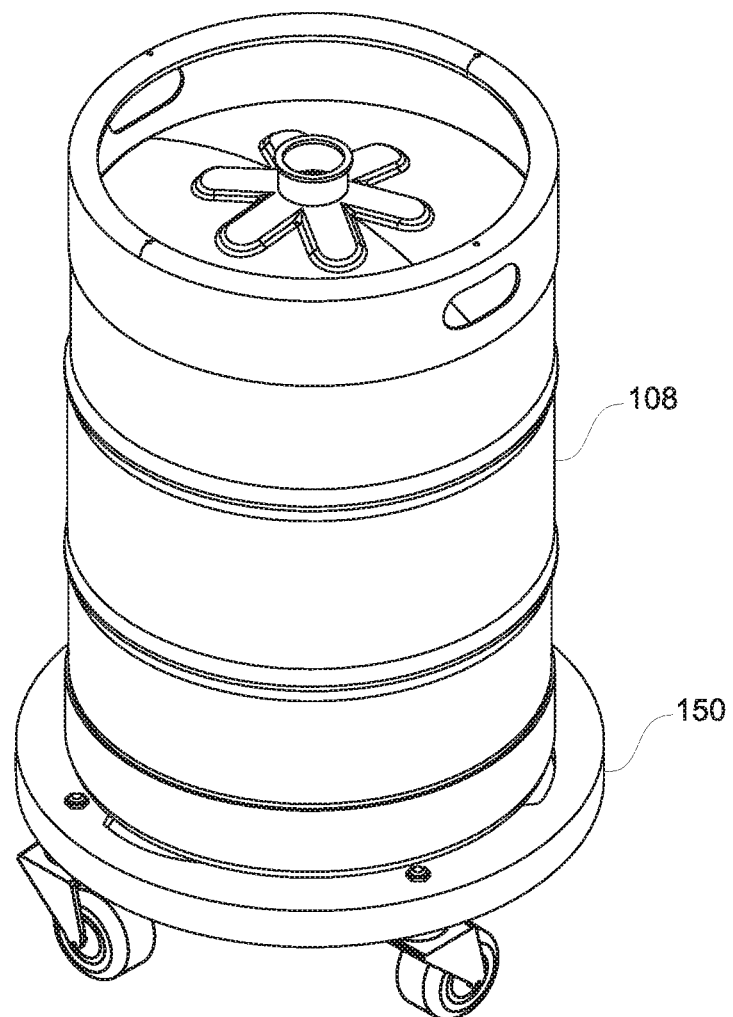
FIG. 5C is a perspective view of a dolly and a keg according to one embodiment of the present invention.

Referring to FIGS. 5A-5C, detailed diagrams of a dolly 150 for use in conjunction with the previously described liquid level measuring system 100 are illustrated. Typically, the dolly 150 can include, but is not limited to, a plate 152, a plurality of castors 154, and a plurality of channels 156.

As shown generally, the liquid level measuring assembly 102 can be placed proximate a center of the plate 152. The plate 152 can include the plurality of channels 156 to allow the engagement arms 124 of the assembly 102 to rotate out as needed based on the size of vessel 108 placed on the dolly 150. In some embodiments, the dolly 150 can include a plurality of circular channels 158 sized to receive a chime of the vessel 108. Typically, the chime of the vessel 108 can fit into the appropriately sized channel 158 with the liquid level measuring assembly 102 being placed proximate a center of a bottom of the vessel 108. In some instances, the liquid level measuring assembly 108 can be coupled to the vessel 108 prior to the vessel 108 being placed on the dolly 150. In other instances, the liquid level measuring assembly 102 can be placed on the dolly 150, and then the vessel 108 can be placed on the dolly 150.

Referring to FIG. 5A, a perspective view of the liquid level measuring assembly 102 on the dolly 150 is illustrated. As shown, the engagement arms 124 are rotated in towards the mount body 120 of the liquid level measuring assembly 102 to interface with a ⅙ barrel.

Referring to FIG. 5B, a perspective view of the liquid level measuring assembly 102 on the dolly 150 is illustrated. As shown, the engagement arms 124 are rotated out away from the mount body 120 of the liquid level measuring assembly 102 to interface with a half barrel.

Referring to FIG. 5C, a perspective view of the vessel 108 (e.g., a half barrel) set on the dolly 150 is illustrated. As shown, the half barrel keg can rest on the dolly 150 allowing for easy transport of the keg from one location to another location. Further, by including the circular channels 158, the chime of the keg 108 can rest in the channel 158 preventing the keg 108 from sliding on the dolly 150 during transport and use. For instance, at a sporting event, the keg 108 could be transferred from a storage area to an area of sale on the dolly 150. A seller of the contents in the keg 108 could then keep track of how much beer has been sold by using the liquid level measuring assembly 102 to determine how much beer is left in the keg. As can be appreciated, the seller may have a smart device that continuously keeps track of an amount of beer in the keg to provide accurate statistics of how much beer was sold versus how much beer was dispensed from the keg. For instance, the system 100 could be implemented to determine an efficiency of pours from the keg to determine how much beer was wasted from foam or spillage while filling cups.

In a typical implementation, the user device 104 can include a program or application configured to calculate a liquid level in a vessel of known volume. The application on the user device 104 can be configured to use data received by the user device 104 from the control module 114.

When a user opens the application after powering the electronics of the liquid level measuring assembly 102 on, the application can present the user with an interface that includes one or more parameters for the user to select based on a current vessel the liquid level measuring system 100 is removably coupled to. For instance, the application may present the user with the option of selecting a vessel size from a predetermined list of standard keg sizes. After the user has selected the vessel size, the user can enable the application to start receiving data generated by the ultrasonic sensor 142 located proximate a bottom of the vessel. The application can then start calculating a liquid level based on data received from the assembly 102. In some instances, the application can use two or more sets of data from the assembly 102 and can average the calculations in case of any anomalies the ultrasonic sensor 142 may produce. The application can then display a graphical representation of the liquid level determined to be in the vessel. Of note, various graphical representations are contemplated.

Typically, the application can continuously receive data from the control module 114 and continuously calculate a liquid level based on the received data. In some instances, the application can be configured to calculate a liquid level in intervals selected by a user or at preset intervals.

In one embodiment, the application can include an option to present a link or direct order option to a user when the liquid level in a vessel falls below a predetermined threshold. In some instances, the application can be set to automatically order a new vessel once the application determines the current liquid level of the vessel falls below a predetermined threshold.

An Embodiment of a Multi-Keg Liquid Level Measuring System

Figure 6:
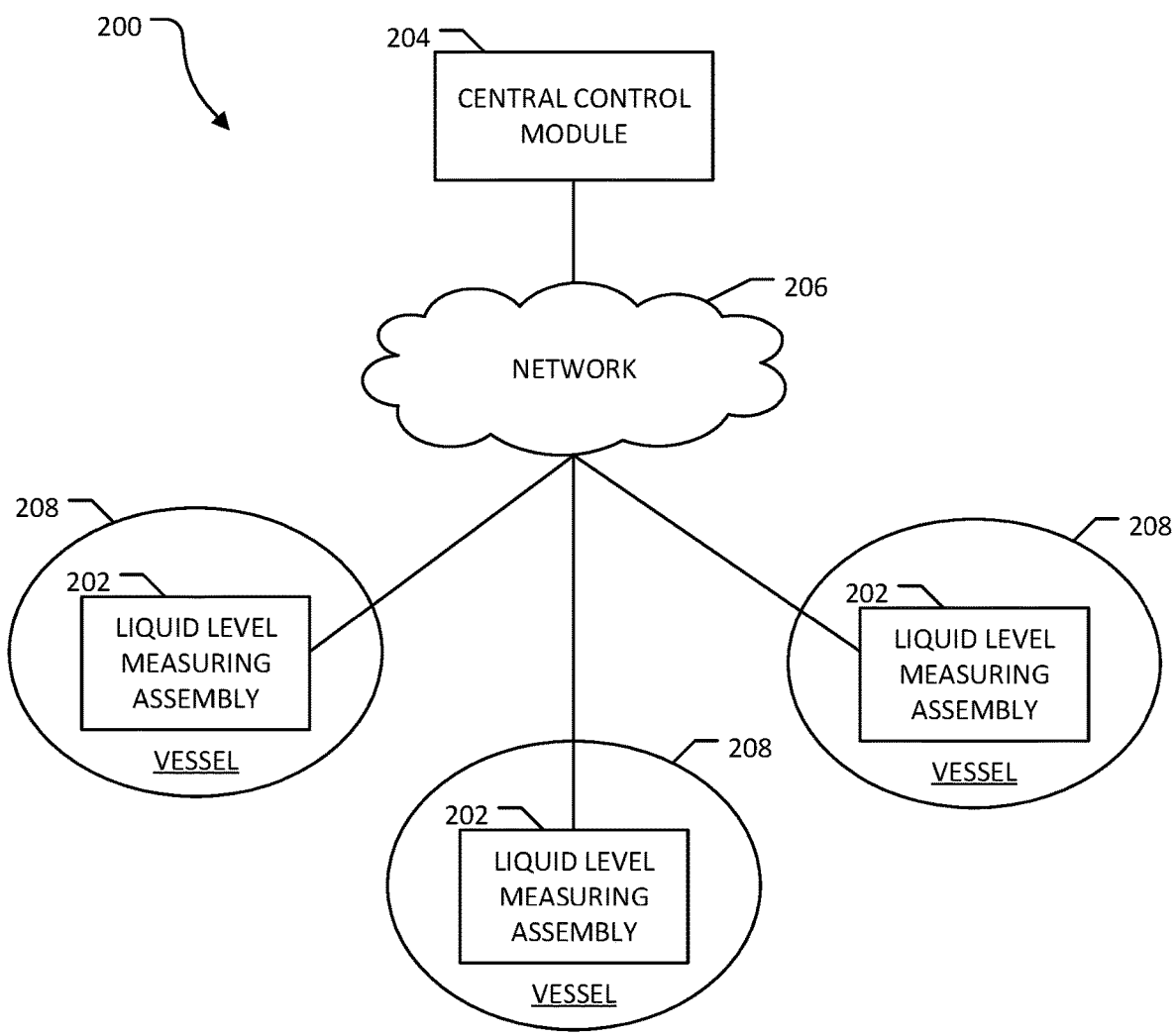
FIG. 6 is a block diagram of a multi-vessel liquid level measuring system according to one embodiment of the present invention.

Referring to FIG. 6, a block diagram of an embodiment 200 of a multi-keg liquid level measuring system is illustrated. The system 200 can be implemented to monitor and keep track of a liquid level in one or more kegs. For instance, the system 200 may be implemented in a bar having a plurality of kegs to keep track of an amount of beer left in each keg and provide alerts when beer levels are getting low in any one of the kegs.

As shown in FIG. 6, the multi-keg liquid level measuring system 200 can include, but is not limited to, a plurality of liquid level measuring assemblies 202, a central control module 204, a network 206, and a plurality of kegs 208. Each of the plurality of liquid level measuring assemblies 202 can be substantially similar and can include components similar to the previously discussed liquid level measuring assembly 102.

In a typical implementation, the plurality of assemblies 202 can each be removably coupled to one of the plurality of kegs 208. The plurality of assemblies 202 can then be wirelessly connected (or via a wired connection) to the central control module 204. The central control module 204 can determine a unique identifier for each of the assemblies 202 and can start to receive ping times from ultrasonic sensors of the assemblies 202. The central control module 204 may then calculate a level of liquid in each of the kegs 208 and present the information to a user in a graphical display. As can be appreciated, a restaurant or bar can keep track of an amount of beer in each of their kegs via the system 200.

A Second Embodiment of a Liquid Level Measuring System

Figure 7:
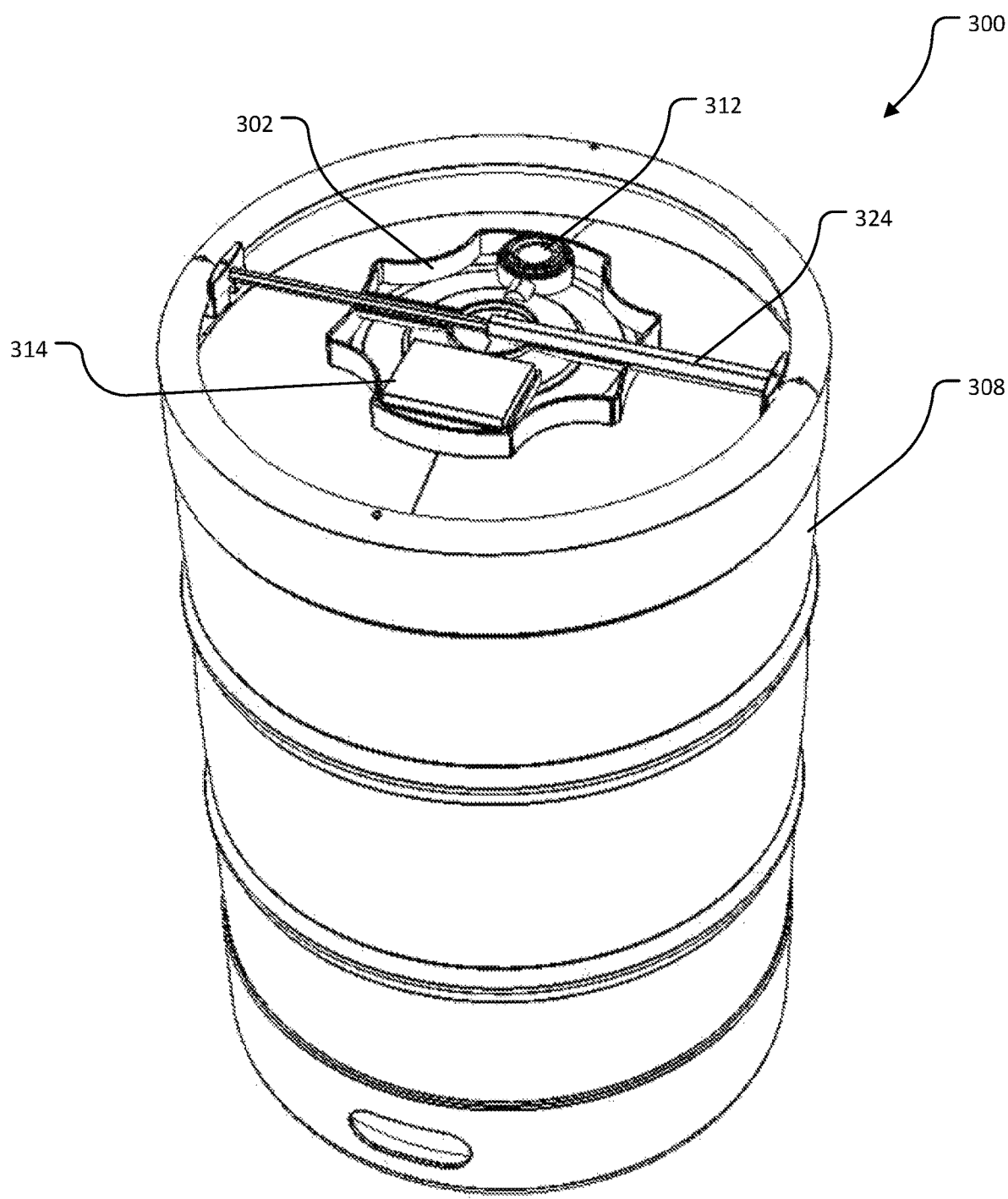
FIG. 7 is a perspective view of a liquid level measuring system according to one embodiment of the present invention.

Referring to FIG. 7, a perspective view of a second embodiment 300 of a liquid level measuring system is illustrated. The liquid level measuring system 300 can be implemented to determine an amount of liquid in a vessel similar to the liquid level measuring system 300. Typically, the system 300 can be coupled to a bottom of a vessel (e.g., bottom of a keg) and implement an ultrasonic sensor to determine (or measure) an amount of liquid in the vessel based on ping times of the ultrasonic sensor. Of note, the second embodiment liquid level measuring system 300 can operate substantially similar to the first embodiment liquid level measuring system 100.

As shown, the second embodiment liquid level measuring system 300 can include, but is not limited to, a liquid level measuring assembly 302 configured to be coupled to a vessel 308. The liquid level measuring assembly 302 can be removably coupled to the vessel 308 from which a level of a liquid in the vessel 308 can be determined.

The system 300 can include components substantially similar to the first embodiment system 300 but can include a different means for removably coupling to a chime of a keg. As shown, the liquid level measuring assembly 302 can include, but is not limited to, an ultrasonic sensor assembly 312, a control module 314, and a telescoping engagement arm 324 configured to extend in opposite directions.

As shown, the telescoping engagement arm 324 can extend in opposite directions to interface with and connect to, differently sized vessels. The telescoping engagement arm 324 can include a pair of ends adapted to interface with a chime of a keg. As can be appreciated, the telescoping engagement arm 324 can be shortened to connect with a smaller barrel size.

Similar to the first embodiment assembly 102, the ultrasonic sensor assembly 324 can be located proximate a perimeter of the assembly 302 to ensure ultrasonic signals sent from the sensor will not interface with a spear or wall of a keg.

The control module 314 can be configured to send data from the ultrasonic sensor assembly 312 to a user device. As mentioned previously, the control module 314 can be configured to determine a liquid level based on the ping times or data related to the ping times can be sent from the control module 314 to a user device configured to calculate a liquid level based on the ping times and other information.

Similar to the first embodiment system 100, the second embodiment system 300 can include a network to remotely connect the liquid level measuring assembly 302 to a user device. Typically, the user device can be a smart device including a smartphone or a tablet. It is to be appreciated that other electronic devices are contemplated.

A Method for Calculating Waste Using a Liquid Level Measuring System

Figure 8:
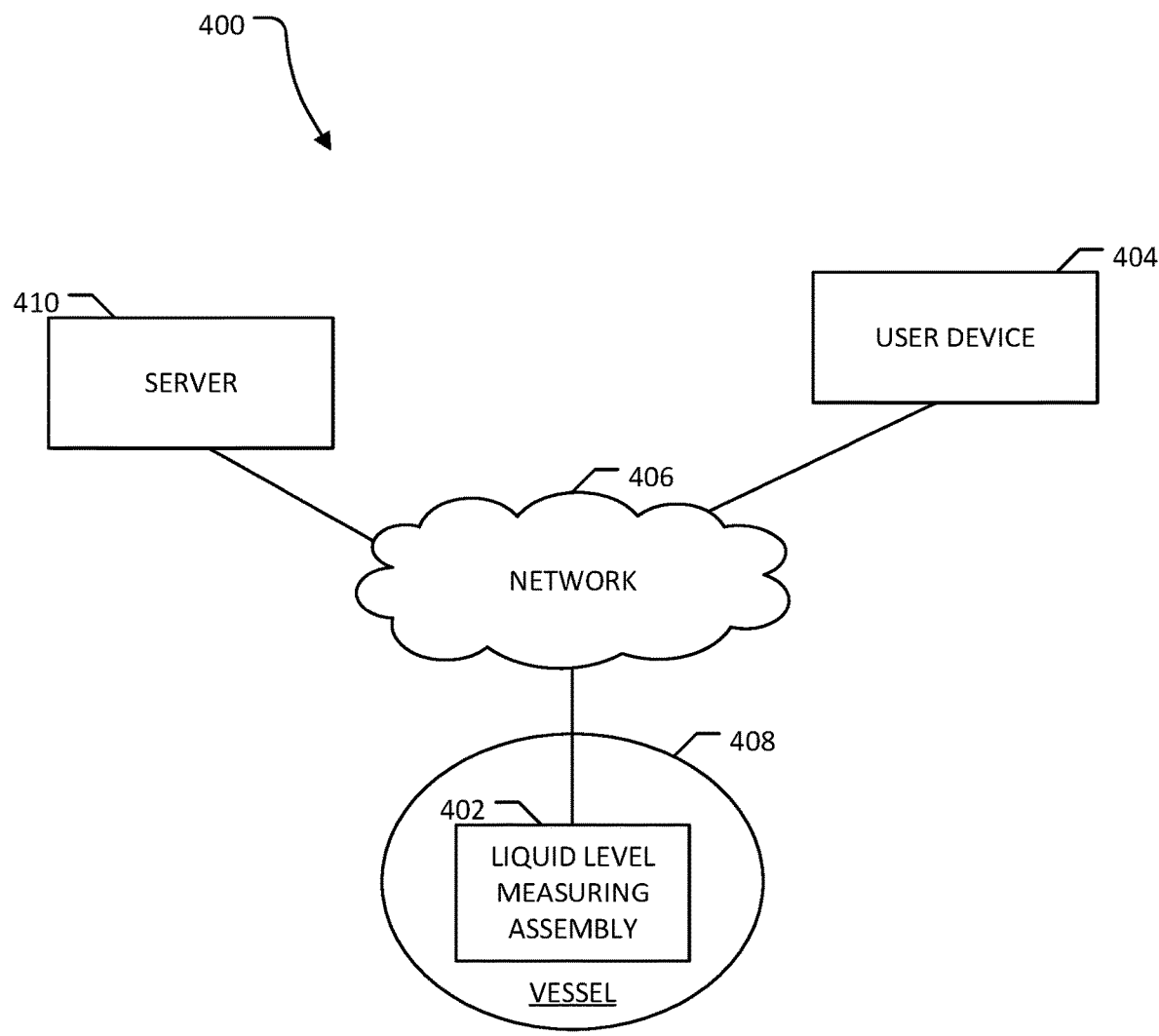
FIG. 8 is a block diagram of a liquid level measuring system according to one embodiment of the present invention.

Referring to FIG. 8, a block diagram of an embodiment 400 of a liquid level measuring system is illustrated. The system 400 can be implemented to monitor and keep track of a liquid level in one or more kegs. Data generated and stored by the system 400 can be implemented to calculate waste. Typically, waste can be lost product that is included in a container for sale that does not end up being paid for. Waste can come from, but is not limited to, spillage, non-tracked sales, mis-tracked sales, etc. For instance, the system 400 can determine how much beer may be wasted when serving beer from a keg. The amount of waste, and thus profit loss, can be determined.

As shown, the liquid level measuring system 400 can include, but is not limited to, a liquid level measuring assembly 402, a user device 404, a network 406, and a server 410. In some embodiments, functionalities of the user device 404 and the server 410 can be combined into a single device. Of note, embodiments are contemplated where the server 410 can be implemented as the central control module 204 when implemented with a plurality of vessels.

The liquid level measuring assembly 402 can be removably coupled to a vessel 408 from which a level of a liquid in the vessel 408 can be determined. The liquid level measuring assembly 402 can be substantially similar to the first embodiment liquid level measuring assembly 102 and include components similar to the first embodiment liquid level measuring assembly 102. Typically, the vessel 408 can be configured to be a pressurized vessel including, but not limited to, kegs, barrels, gas tanks, etc. For instance, the vessel may be a keg configured to store beer. In another instance, the vessel may be a tank configured to store liquified propane.

The network 406 can be implemented to remotely connect the liquid level measuring assembly 402 to the server 410. The server 410 may be remotely connected to the user device 404 via the network 406. In one embodiment, the user device 404 may be part of a point of sale system located in a business. For instance, the user device 404 may be a point of sale device in a restaurant. The point of sale system can typically keep track of a number of units of liquid sold and entered by a server or other worker.

The server 410 can represent a server or be another powerful, dedicated computer system that can support multiple user sessions. In some embodiments, the server 410 can be any type of computing device including, but not limited to, a personal computer, a game console, a smartphone, a tablet, a netbook computer, or other computing devices. In one embodiment, the server 410 can be a distributed system wherein server functions are distributed over several computers connected to a network. The server 410 can typically include a hardware platform and software components. In some instances, the user device 404 may be implemented as the server 410.

The server 410 can include an application or program configured to determine an amount of waste for a vessel filled with a predetermined amount of liquid. Typically, the server 410 can receive data about an amount of liquid in a vessel from the liquid level measuring assembly 402. The server 410 may also receive data from the user device 406 about how many units of liquid have been sold. Based on the information received from the liquid level measuring assembly 402 and the user device 404, the application running on the server 410 can be configured to determine an amount of wasted liquid. For instance, the application can compare an expected amount of liquid based on a number of units sold versus the actual amount of liquid based on data received from the liquid level measuring assembly 402. Embodiments are contemplated where the application configured to determine waste can be used by the user device 404.

A method (or process) for implementing the liquid level measuring assembly 402 to help determine an amount of waste can include, but is not limited to, the following steps. Of note, the previously described liquid level measuring assemblies 102, 202, 302 can be implemented.

In a first step, a vessel having a predetermined amount of liquid can be fitted with the liquid level measuring assembly 402. Once the liquid level measuring assembly 402 is coupled to the vessel, the liquid level measuring assembly 402 can be powered on and start to send data to the server 410 via the network 406. The server 410 can be configured to store data received from the liquid level measuring assembly 402. In some instances, the liquid level measuring assembly 402 can be provided with a unique identifier and information about the liquid in the vessel can be provided to the server 410. Generally, the liquid level measuring assembly 402 can continuously send data to the server 410. In some instances, data from the liquid level measuring assembly 402 can be sent in intervals.

In a second step, the vessel can be associated with a liquid for sale via the user device 404. As previously mentioned, the user device 404 can be part of a point of sale system. As liquid is sold in units to customers, a worker can input the sale and quantity of liquid sold. The point of sale system can keep track of a number of units sold of the liquid in the vessel. Data from the user device 404 can be continuously sent to the server 410. In other instances, data can be sent in set intervals to the server 410 for storage. In one instance, data related to the amount of unit sales can be sent once the vessel has been emptied or changed out.

In a third step, the server 410 can run the application to determine an amount of waste for the vessel. Typically, a user can request an analysis on an amount of waste. In some instances, the server 410 may periodically send waste information updates to a user. As previously mentioned, the application can use data received from the liquid level measuring assembly 402 and the user device 404. The liquid level measuring assembly 402 can send liquid level data to the server 410 and the user device 404 can send units and quantity sold data to the server 410. The application can first determine an expected volume of liquid remaining in the vessel. To determine this, the application can use the size of the vessel and maximum amount of liquid storable in the vessel and subtract the amount of liquid sold. The amount of liquid sold can be determined from the data received from the user device 404. After the expected volume remaining is determined, the application can get a current measured volume of liquid determined by the liquid level measuring assembly 402. The application may then determine a difference between the measured amount to the expected amount. The difference between the two can be an amount of waste (or potentially savings) of liquid in the vessel.

In a fourth step, the server 410 can send the results from the application to the user device 404. The user device 404 can include an application or program for graphically displaying the data from the server 410. As previously mentioned, embodiments are contemplated where the user device 404 may run the application to determine an amount of waste.

Described hereinafter is one example of how the application on the server 410 can determine how much beer served from a keg has been wasted. In the example below, the system 400 can be implemented with a business that sells beer and has a point of sale system. A liquid level measuring assembly can be operatively connected to the keg. The liquid level measuring assembly can send data to the server 410. In some instances, the assembly can be connected to the network 406. In other instances, the assembly may be connected to the user device 404, which may then store and/or send the data to the server 410.

The business can send data to the server 410 via a business device. The server 410 can store the data and use the data to help determine waste. The server 410 can send data back to the business device which can provide a graphical representation of the waste.

The business device can send point of sale data in intervals (e.g., once a day, hourly, etc.) to the server 410. The point of sale data can include, but is not limited to, beer type, beer cost, serving sizes, cost per size, etc. The server 410 can receive the point of sale data and store the data. Of note, the point of sale data can be associated with the business that sent the data.

The liquid level measuring assembly operatively connected to the keg can send liquid level data to the server 410. The server can receive the data and store the data for later analysis.

The server 410 may then analyze the data from the business device and the liquid level measuring assembly. The point of sale data can be used to determine an amount of beer sold and the liquid level measuring assembly data can determine the actual amount of beer dispensed. A max volume of the keg minus the total volume of beer sold can give an expected amount of beer left. A difference between the actual amount of beer in the keg and the expected amount of beer can be how much beer was wasted.

For example, if a half barrel keg with a max volume of 1,984 oz. and the point of sale data indicated that two 12 oz. beers have been sold, the expected amount of beer left in the keg would be 1,960 oz. If the liquid level measuring assembly determined the actual amount of beer left is 1,948 oz., the application on the server 410 would determine that the point of sale system did not track one 12 oz. beer. As such, 12 ounces of beer were wasted. Of note, the application can run a near real time analysis of waste based on continuously receiving data from the liquid level measuring assembly and the business device.

ALTERNATIVE EMBODIMENTS AND VARIATIONS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method for determining an amount of wasted liquid being stored in a container, the method comprising:
   providing a liquid level measuring assembly, the assembly including:
      an ultrasonic sensor;
      a control module configured to receive signals from the ultrasonic sensor; and
      a mount body including:
         a ring having a plurality of teeth; and
         three engagement members, each of the three engagement members including (i) one or more magnets located at a distal end, and (ii) a plurality of teeth located at a proximal end adapted to operatively interact with the plurality of teeth of the ring;
   securing the liquid level measuring assembly to the container; and
   determining an amount of wasted liquid.

2. The method of claim 1, wherein the step of determining an amount of liquid wasted includes:
   receiving data from the control module of the liquid level measuring assembly;
   determining an actual liquid level based on the data received from the control module;
   receiving data from a point of sale system, the container being associated with the point of sale system;
   determining an expected liquid level based on the data received from the point of sale system; and
   comparing the actual liquid level to the expected liquid level to determine the amount of wasted liquid.

3. The method of claim 2, wherein the control module continuously sends data.

4. The method of claim 3, wherein the data received from the control module is stored and includes a time stamp for each measurement.

5. The method of claim 2, wherein the expected liquid level is based on an amount of liquid sold and tracked by the point of sale system.

6. The method of claim 2, wherein the actual liquid level is based on a measurement taken by the liquid level measuring assembly.

7. The method of claim 1, wherein (i) the container includes a chime;
   and (ii) the step of securing the liquid level measuring assembly to the container includes:
      placing the liquid level measuring device inside of and approximate a middle of the chime; and
      rotating the three engagement members outwards until the magnets engage the chime.

8. The method of claim 1, wherein the mount body includes a waterproof housing for storing the control module.

9. The method of claim 1, wherein (i) the container includes a chime;
   and (ii) the step of securing the liquid level measuring assembly to the container includes:
      providing a dolly, the dolly being defined by:
         a plate;
         a plurality of castors coupled to the plate;
         a plurality of channels in the plate adapted to allow the engagement members to rotate; and
         a plurality of circular channels each sized to receive a differently sized chime;
      placing the liquid level measuring assembly on the dolly;
      placing the container on the dolly with the liquid level measuring assembly being located approximate a middle of the chime of the container; and
      rotating the three engagement members outwards until the magnets engage the chime.

10. A liquid level measuring assembly comprising:
    an ultrasonic sensor;
    a control module configured to receive signals from the ultrasonic sensor; and
    a mount body including:
       a ring having a plurality of teeth; and
       three engagement members, each of the three engagement members including (i) one or more magnets located at a distal end, and (ii) a plurality of teeth located at a proximal end adapted to operatively interact with the plurality of teeth of the ring.

11. The liquid level measuring assembly of claim 10, the liquid level measuring assembly in combination with a dolly, the dolly being defined by:
    a plate;
    a plurality of castors coupled to the plate;
    a plurality of channels in the plate adapted to allow the engagement members to rotate; and
    a plurality of circular channels each sized to receive a differently sized chime.

12. The combination of claim 11, wherein the liquid level measuring assembly is adapted to be placed on the plate of the dolly.

13. The combination of claim 11, wherein the liquid level measuring assembly and a container having a chime are placed on the dolly.

14. The combination of claim 13, wherein the liquid level measuring assembly is removably coupled to the container.

15. The liquid level measuring assembly of claim 10, wherein the liquid level measuring assembly is adapted to be coupled to a ⅙ barrel sized keg up to a ½ barrel sized keg.

16. A multi-keg liquid level measuring system comprising:
    a plurality of liquid level measuring assemblies, each of the liquid level measuring assemblies including:
      an ultrasonic sensor; and
      a mount body including:
        a ring having a plurality of teeth; and
        three engagement members, each of the three engagement members including (i) one or more magnets located at a distal end, and (ii) a plurality of teeth located at a proximal end adapted to operatively interact with the plurality of teeth of the ring;
    a plurality of kegs each having a chime; and
    a control module configured to receive signals from each of the ultrasonic sensors of the plurality of liquid level measuring assemblies.

17. The multi-keg liquid level measuring system of claim 16, wherein each of the plurality of liquid level measuring assemblies are coupled to a different one of the plurality of kegs.

18. The multi-keg liquid level measuring system of claim 16, wherein the control module is configured to determine an amount of liquid in each of the plurality of kegs.

19. The multi-keg liquid level measuring system of claim 16, wherein the control module is connected to a point of sale system.

20. The multi-keg liquid level measuring system of claim 19, wherein the point of sale system provides sales data to the control module.

* * * * *